United States Patent
Ellis et al.

(10) Patent No.: US 10,338,266 B1
(45) Date of Patent: Jul. 2, 2019

(54) EMU IMPULSE ANTENNA FOR LOW FREQUENCY RADIO WAVES USING GIANT DIELECTRIC AND FERRITE MATERIALS

(71) Applicant: Saudi Arabian Oil Company, Dhahran (SA)

(72) Inventors: Erika Ellis, Dhahran (SA); Howard K. Schmidt, Dhahran (SA); Jesus Manuel Felix Servin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/365,170

(22) Filed: Mar. 26, 2019

Related U.S. Application Data

(63) Continuation of application No. 15/820,944, filed on Nov. 22, 2017, which is a continuation-in-part of application No. 15/458,772, filed on Mar. 14, 2017.

(51) Int. Cl.
*G01D 7/00* (2006.01)
*G01V 3/30* (2006.01)
(Continued)

(52) U.S. Cl.
CPC .................. *G01V 3/30* (2013.01); *G01V 3/20* (2013.01); *G01V 2003/084* (2013.01)

(58) Field of Classification Search
CPC . G01V 5/04; G01V 5/101; G01V 5/12; G01V 5/06; G01V 5/08; G01V 5/045;
(Continued)

(56) References Cited

U.S. PATENT DOCUMENTS 3,146,351 A 8/1964 Hover et al.
3,238,477 A 3/1966 Brueckmann
(Continued)

FOREIGN PATENT DOCUMENTS

CN 102147484 A 8/2011
EP 2884309 A2 6/2015
(Continued)

OTHER PUBLICATIONS

International Search Report and Written Opinion for International Application No. PCT/US2018/022294, dated Jul. 6, 2018 (pp. 1-16).
(Continued)

*Primary Examiner* — Jermele M Hollington
*Assistant Examiner* — Taqi R Nasir
(74) *Attorney, Agent, or Firm* — Bracewell LLP; Constance G. Rhebergen; Linda L. Morgan

(57) ABSTRACT

An electromagnetic energy source for emitting pulses of electromagnetic energy includes a sonde assembly having a first section axially aligned with, and spaced from, a second section. An energy storage capacitor includes an electrode mounted in each of the first section and the second section of the sonde assembly and operable to generate an electric field. A capacitive charge storage medium is mounted in each of the first section and the second section of the sonde assembly and surrounds each electrode, where the capacitive charge storage medium is a giant dielectrics and giant permeability ferrite. A fast-closing switch is located between the first and second sections of the sonde assembly.

8 Claims, 8 Drawing Sheets

(51) Int. Cl.
*G01V 3/20* (2006.01)
*G01V 3/08* (2006.01)

(58) Field of Classification Search
CPC ........ G01V 5/125; G01V 11/00; G01V 13/00; G01V 5/10; G01V 5/102
USPC ........ 324/226, 262, 219–221, 239–243, 338, 324/339, 340–343, 356–369, 437, 324/754.01–755.01
See application file for complete search history.

(56) References Cited

U.S. PATENT DOCUMENTS

| | | | |
|---|---|---|---|
| 4,109,522 A | | 8/1978 | Thompson |
| 4,246,586 A | | 1/1981 | Henderson et al. |
| 4,430,653 A | | 2/1984 | Coon et al. |
| 4,498,086 A | | 2/1985 | Sandler |
| 4,661,700 A | | 4/1987 | Holenka |
| 4,785,247 A | * | 11/1988 | Meador ................. E21B 47/011 324/338 |
| 4,876,450 A | | 10/1989 | Montgomery |
| 5,041,922 A | | 8/1991 | Wood et al. |
| 5,192,952 A | | 3/1993 | Johler |
| 5,280,284 A | | 1/1994 | Johler |
| 5,302,895 A | | 4/1994 | Philpot |
| 5,323,114 A | | 6/1994 | Nagamune et al. |
| 5,373,443 A | * | 12/1994 | Lee ........................... G01V 3/30 324/338 |
| 6,043,947 A | | 3/2000 | Gooch et al. |
| 6,061,633 A | | 5/2000 | Fukuhara et al. |
| 6,483,310 B1 | * | 11/2002 | Meador .................... G01V 3/28 324/338 |
| 6,651,739 B2 | | 11/2003 | Arndt et al. |
| 6,753,814 B2 | | 6/2004 | Killen et al. |
| 7,477,162 B2 | | 1/2009 | Clark |
| 8,030,934 B2 | | 10/2011 | Barsukov et al. |
| 8,664,587 B2 | | 3/2014 | Evans et al. |
| 8,810,247 B2 | | 8/2014 | Kuckes |
| 8,917,094 B2 | | 12/2014 | Bittar et al. |
| 8,957,683 B2 | | 2/2015 | Bittar et al. |
| 9,206,645 B2 | | 12/2015 | Hallundbaek |
| 9,490,518 B1 | | 11/2016 | Herbsommer et al. |
| 9,520,649 B2 | | 12/2016 | De Rochemont |
| 9,568,635 B2 | | 2/2017 | Suhami |
| 2005/0030036 A1 | * | 2/2005 | Hunziker ............... E21B 47/011 324/338 |
| 2006/0151863 A1 | | 7/2006 | Das et al. |
| 2006/0203613 A1 | | 9/2006 | Thomsen et al. |
| 2007/0209799 A1 | | 9/2007 | Vinegar et al. |
| 2007/0294036 A1 | | 12/2007 | Strack et al. |
| 2008/0036452 A1 | | 2/2008 | Hirayama |
| 2009/0133870 A1 | | 5/2009 | Pavlov et al. |
| 2009/0150077 A1 | | 6/2009 | Stoller et al. |
| 2009/0179646 A1 | | 7/2009 | Fath et al. |
| 2009/0179649 A1 | * | 7/2009 | Schmidt ................... G01V 3/26 324/345 |
| 2009/0204330 A1 | | 8/2009 | Thomsen et al. |
| 2009/0205899 A1 | | 8/2009 | Geerits et al. |
| 2009/0224610 A1 | | 9/2009 | Fuks et al. |
| 2009/0240436 A1 | * | 9/2009 | Heigl ....................... G01V 1/48 702/11 |
| 2010/0060381 A1 | | 3/2010 | Das et al. |
| 2010/0085041 A1 | | 4/2010 | Pozidis et al. |
| 2010/0155128 A1 | | 6/2010 | Tombs |
| 2010/0155138 A1 | | 6/2010 | Kuckes |
| 2010/0171426 A1 | | 7/2010 | Kloss et al. |
| 2011/0108283 A1 | | 5/2011 | Srnka et al. |
| 2011/0198078 A1 | | 8/2011 | Harrigan et al. |
| 2011/0227577 A1 | | 9/2011 | Zhang et al. |
| 2011/0255371 A1 | | 10/2011 | Jing et al. |
| 2012/0120767 A1 | | 5/2012 | Vu et al. |
| 2012/0201096 A1 | | 8/2012 | Valero et al. |
| 2013/0006535 A1 | * | 1/2013 | Zhang ...................... G01V 5/08 702/7 |
| 2013/0066587 A1 | | 3/2013 | Kalathil et al. |
| 2013/0088364 A1 | | 4/2013 | Bittar et al. |
| 2013/0146756 A1 | | 6/2013 | Schmidt |
| 2013/0249705 A1 | * | 9/2013 | Sharp .................. E21B 47/0905 340/854.7 |
| 2013/0319685 A1 | * | 12/2013 | Pike ....................... E21B 41/00 166/378 |
| 2014/0060804 A1 | | 3/2014 | Barbour et al. |
| 2014/0183694 A1 | | 7/2014 | Gardner et al. |
| 2014/0275956 A1 | | 9/2014 | Fan |
| 2014/0347055 A1 | | 11/2014 | Schmidt |
| 2015/0097561 A1 | | 4/2015 | Desmulliez et al. |
| 2015/0295651 A1 | | 10/2015 | Herbsommer et al. |
| 2015/0357121 A1 | | 12/2015 | Andrakin |
| 2016/0327677 A1 | | 11/2016 | Fouda et al. |
| 2017/0012361 A1 | | 1/2017 | Prammer |

FOREIGN PATENT DOCUMENTS

| | | |
|---|---|---|
| WO | 2008033225 A2 | 3/2008 |
| WO | 2016018377 A1 | 2/2016 |
| WO | 2016089387 A1 | 6/2016 |

OTHER PUBLICATIONS

International Search Report and Written Opinion, PCT/US2012/068367, dated Aug. 20, 2013.
Gao, B. et al.,"Ferrite Film Loaded Frequency Selective Metamaterials for Sub-GHz Applications", pp. 1-9, Materials 2016, 9(12), 1009.
Gong, B. et al; "Approach Trims Size of Dipole Antenna", Apr. 23, 2014.
Hwang, Y. et al., "Planar inverted F antenna loaded with high permittivity material", Electronics Letters, Sep. 28, 1995, pp. 1710-1712, vol. 31, Issue: 20, Shatin, NT, Hong Kong.
International Search Report and Written Opinion, PCT/US2012/068367, dated Aug. 20, 2013; 9 pages.
James, J.R. et al., "Electrically short monopole antennas with dielectric or ferrite coatings", Proceedings of the Institution of Electrical Engineers, vol. 125, Issue: 9; Sep. 1978, pp. 793-803.
Petrov, R.V., et al., "Antenna miniaturization with ferrite ferroelectric composites", Microwave and Optical Technology Letters, vol. 50, Issue 12, pp. 3154-3157, Dec. 2008.
Saenz, et al., "Resonant Meta-Surface Superstrate for Single and Multifrequency Dipole Antenna Arrays", IEEE Transactions on Antennas and Propagation, vol. 56 No. 4, pp. 951-960.
International Search Report and Written Opinion for related PCT application PCT/US2018/059585 dated Mar. 4, 2019; pp. 1-15.
International Search Report and Written Opinion for related PCT application PCT/US2018/062177 dated Mar. 4, 2019; pp. 1-17.
Subramanian et al., "High Dielectric Constant in ACu3Ti4O12 and ACu3Ti3FeO12 Phases", Journal of Solid State Chemistry, 2000, pp. 323-325, vol. 151, No. 2, Academic Press.
Thomas et al., "Nanoparticles of the giant dielectric material, CaCu3Ti4O12 from a precursor route", Journal of Physics and Chemistry of Solids, 2008, pp. 1-47.

* cited by examiner

EMU IMPULSE ANTENNA FOR LOW FREQUENCY RADIO WAVES USING GIANT DIELECTRIC AND FERRITE MATERIALS

CROSS REFERENCE TO RELATED APPLICATION

This application is a continuation of, and claims priority to and the benefit of, co-pending U.S. application Ser. No. 15/820,944, filed Nov. 22, 2017, titled "EMU Impulse Antenna for Low Frequency Radio Waves Using Giant Dielectric and Ferrite Materials," which is a continuation in part of, and claims priority to and the benefit of, co-pending U.S. application Ser. No. 15/458,772, filed Mar. 14, 2017, titled "EMU Impulse Antenna," the full disclosure of each of which is incorporated in this disclosure by reference in its entirety for all purposes.

BACKGROUND

1. Field of the Disclosure

The present disclosure relates to imaging sub-surface structures, particularly hydrocarbon reservoirs and fluids within the hydrocarbon reservoirs, and more particularly to electromagnetic energy sources for electromagnetic surveying of sub-surface structures.

2. Description of the Related Art

Some electromagnetic (EM) surveying systems used in geophysics provide electromagnetic energy for traveling through a subsurface hydrocarbon reservoir for electromagnetic imaging of the subsurface hydrocarbon reservoir. Multiple sources and receivers can be positioned either in a bore that extends to the subsurface hydrocarbon reservoir or an earth surface above the subsurface hydrocarbon reservoir. In this way, the direction, velocity and saturation of injected fluids (such as during water flood) can be monitored. The system can also be used to locate by-passed oil and detect high conductivity zones (such as fracture corridors and super-k zones) to provide early warning of water breakthrough. Such operations can assist in optimizing reservoir management and preventing oil bypass for improving volumetric sweep efficiency and production rates.

Many current slow wave antenna models target high frequency (HF) or very high frequency (VHF) electromagnetic waves in the range of 10 megahertz (MHz)-300 MHz. Some current EM systems in geophysics include an overly large antenna in order to be able to generate a moderately lower frequency signal, such as applications with frequencies in the 10 kHz-1 MHz range, out of a small antenna. The apparent 'aperture' of the antenna (wavelength to antenna size ratio) can be problematic. Some current EM systems cannot easily match impedance of the system to the geological matrix for increasing transmission efficiency. Some current EM systems use high-current cable to provide power to the EM transmitter. However, these systems have been shown to have difficulty transferring a crisp high-current pulse from the power supply down a low-loss cable, and then matching that pulse into the antenna. In addition, the high-current cabling can also transmit a signal, which makes the resulting measurements unclear.

SUMMARY OF THE DISCLOSURE

Embodiments of this disclosure combine a slow-wave antenna with energy storage and pulse forming elements to realize a high power, small aperture transmitting antenna that is ideally suited for downhole electromagnetic interrogation technologies, such as for electromagnetic imaging of a subsurface hydrocarbon reservoir. Systems and methods described in this disclosure provide a transmitter that is compact, high in instantaneous power output and generates a clean signal. As used herein, a "high power" is considered to be a power in a range of a number of kilowatts to a number of megawatts.

Embodiments of this disclosure provide a dipole antenna that is shorter than some currently available antennas because the cladding materials of the electromagnetic impulse antenna includes hybrid materials called giant dielectrics and giant permeability ferrites, which allows for a reduction of the physical antenna length so that the antenna is manageable for downhole use in low frequency ranges, such as applications with frequencies in the 10 kHz-1 MHz range. As used herein, an "EMU" antenna is an acronym for an antenna having electrical permittivity (E), and magnetic permeability (MU).

In addition, the antenna elements of embodiments of this disclosure are used as capacitive energy storage elements, with each half of the dipole initially held at a high voltage relative to one another The voltage will be dependent on the capacitance and impedance of the circuit, as well as dimensions of the antenna, and will change with the frequency of operation of the antenna. The voltage of one half of the dipole is equal and opposite of the voltage, with the outermost end of each half therefore having the greatest magnitude of voltage. As used herein, the "high voltage" of each half of the dipole relative to the other can be in a range 1000 volts (V) and above.

A fast-closing switch, such as a triggered spark gap, is provided between a pair of such antennas to initiate pulsed transmission. The pair of antennas is biased apart by a large voltage so that the structure can discharge in a single massive current pulse and emit a very high power transient radio frequency signal. While the magnitude of the current will depend on the power and the resistance of the antenna and the voltage, which in turn depends on the frequency, as used herein, a "massive current" is considered to be in a current in the range of 100-1000 amperes (A). Systems and methods of this disclosure therefore combine energy storage, pulse formation and radiating elements into a single structure, eliminating the need for impedance matching between separate distributed components for these respective functions.

Systems and methods of this disclosure eliminate the problem of load matching between a power supply, cable or transmission-line and antenna. With the energy storage element and switch inside the transmitting antenna element, the cable between the two is eliminated, minimizing reflections and losses in the system.

In an embodiment of this disclosure, an electromagnetic energy source for emitting pulses of electromagnetic energy includes a sonde assembly including a first section axially aligned with, and spaced from, a second section. An energy storage capacitor includes an electrode mounted in each of the first section and the second section of the sonde assembly and operable to generate an electric field. A capacitive charge storage medium is mounted in each of the first section and the second section of the sonde assembly and surrounds each electrode, where the capacitive charge storage medium is a giant dielectrics and giant permeability ferrite. A fast-closing switch is located between the first section and the second section of the sonde assembly.

In alternate embodiments, the electromagnetic energy source can further include a high voltage power supply connected between the first section and the second section of the sonde assembly. The fast-closing switch and the high voltage power supply can be connected between the electrodes. Current limiting resistors can be located between the high voltage power supply and the electrodes.

In other alternate embodiments, the electromagnetic energy source can further include a plurality of electromagnetic energy sources emitting pulses of electromagnetic energy to travel through a subsurface hydrocarbon reservoir. The electromagnetic energy source can be movable to a succession of locations in a well borehole for emitting the pulses of electromagnetic energy at the succession of locations for travel through a subsurface hydrocarbon reservoir. The sonde assembly can have a conductor member serving as a first conductor and the electrode serves as a second conductor. The capacitive charge storage medium can be located between the conductor member and the electrode. The conductor member is electrically isolated from the electrode with the capacitive charge storage medium.

In an alternate embodiment of this disclosure, a source for emitting the pulses of electromagnetic energy to travel through a subsurface hydrocarbon reservoir for electromagnetic imaging of the subsurface hydrocarbon reservoir includes the sonde assembly and fast closing switch attached to a wireline for travel in a well borehole to a depth of interest.

In yet another alternate embodiment of this disclosure, a system for using pulses of electromagnetic energy for electromagnetic imaging of a subsurface hydrocarbon reservoir includes at least one electromagnetic energy source, each electromagnetic energy source including a sonde assembly attached to a wireline for travel in a well borehole to a depth of interest, the sonde assembly including a first section axially aligned with, and spaced from, a second section. An energy storage capacitor includes an electrode mounted in each of the first section and the second section of the sonde assembly and operable to generate an electric field and a capacitive charge storage medium mounted in each of the first section and the second section of the sonde assembly and surrounding each electrode, where the capacitive charge storage medium is a giant dielectrics and giant permeability ferrite. A fast-closing switch is located between the first section and the second section of the sonde assembly. A plurality of electromagnetic sensors form a measure of a resulting signal from the electromagnetic energy source.

In alternate embodiments, the plurality of electromagnetic sensors can be mounted in a well tool lowered in sensor bore in the subsurface hydrocarbon reservoir. The plurality of electromagnetic sensors can be located in an array over an earth surface above the subsurface hydrocarbon reservoir. A system control unit can be used for storing information relating to the resulting signal received by the plurality of electromagnetic sensors and for performing a computerized analysis of the resulting signal.

In still another alternate embodiment of this disclosure, a method for emitting pulses of electromagnetic energy with an electromagnetic energy source include providing the electromagnetic energy source having a sonde assembly including a first section axially aligned with, and spaced from, a second section. An energy storage capacitor includes an electrode mounted in each of the first section and the second section of the sonde assembly and a capacitive charge storage medium mounted in each of the first section and the second section of the sonde assembly and surrounding the electrode, where the capacitive charge storage medium is a giant dielectrics and giant permeability ferrite. A fast-closing switch is located between the electrodes of the first section and the second section. The energy storage capacitor is charged to cause the fast-closing switch to close and pulses of electromagnetic energy to be emitted from the electromagnetic energy source.

In alternate embodiments, the electromagnetic energy source can further include a high voltage power supply connected to the electrode of the first section and the electrode of the second section of the sonde assembly. The electromagnetic energy source can further include current limiting resistors located between the high voltage power supply and both of the electrode of the first section and the electrode of the second section. The method can further include lowering the electromagnetic energy source on a wireline in a well borehole to a depth of interest in a subsurface hydrocarbon reservoir. The electromagnetic energy source can be moved to a succession of locations in a well borehole for emitting the pulses of electromagnetic energy at the succession of locations for travel through a subsurface hydrocarbon reservoir.

In other alternate embodiments, a plurality of electromagnetic sensors can be lowered through a sensor bore in a subsurface hydrocarbon reservoir. A plurality of electromagnetic sensors can be located in an array over an earth surface above a subsurface hydrocarbon reservoir. The pulses of electromagnetic energy emitted from the electromagnetic energy source can be directed to travel through a subsurface hydrocarbon reservoir, a measure of arrival time data of the pulses of electromagnetic energy at a plurality of electromagnetic sensors can be formed, the measure of arrival time data from the plurality of electromagnetic sensors can be analyzed to form a representation of subsurface features of the subsurface hydrocarbon reservoir, and an image of the representation of subsurface features of the subsurface hydrocarbon reservoir can be formed.

BRIEF DESCRIPTION OF THE DRAWINGS

So that the manner in which the recited features, aspects and advantages of the disclosure, as well as others that will become apparent, are attained and can be understood in detail, a more particular description of the embodiments of the disclosure previously briefly summarized may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE PREFERRED EMBODIMENTS

Figure 1:
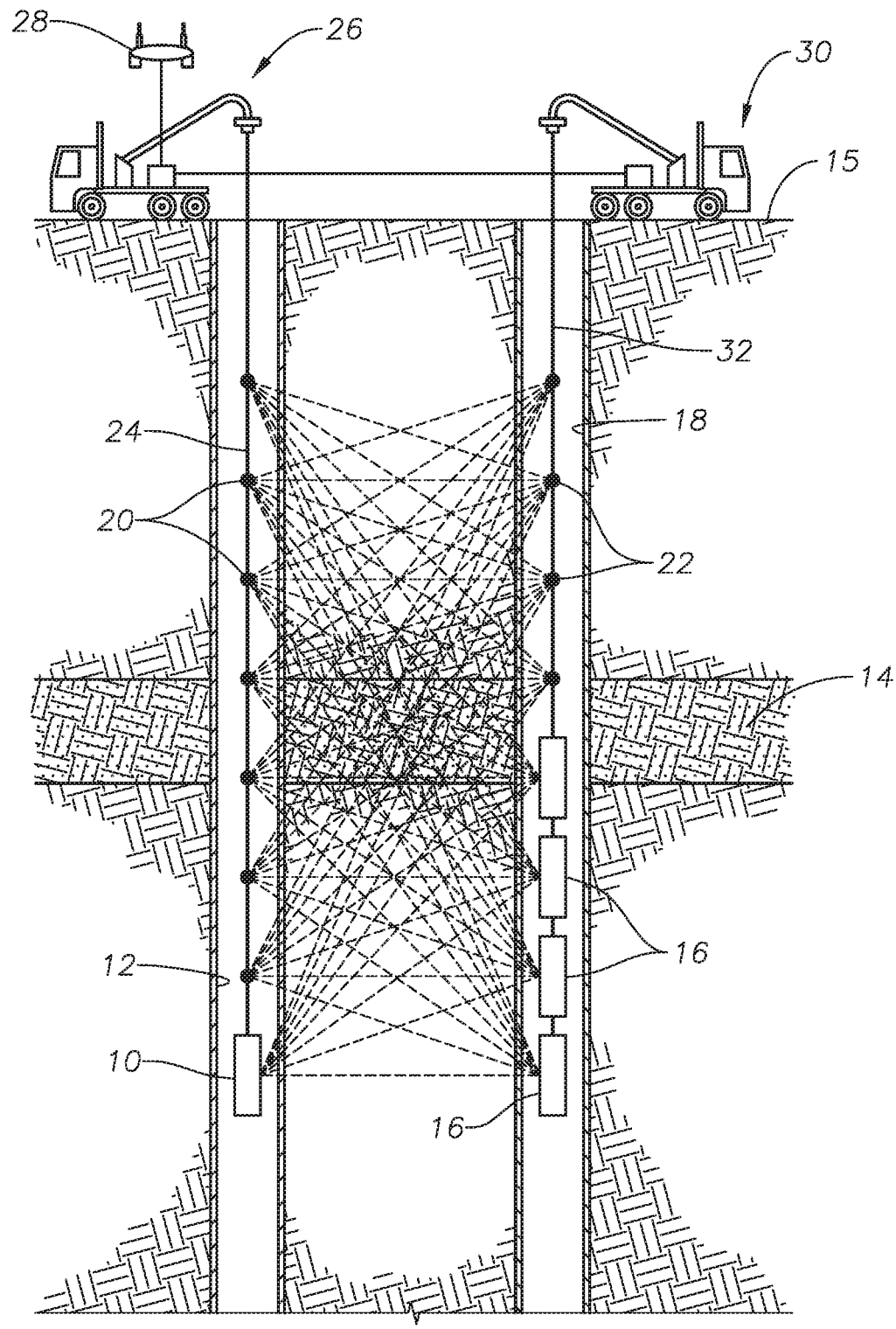
FIG. 1 is a schematic section view of a transmitter-receiver array for a borehole to borehole electromagnetic survey, in accordance with an embodiment of this disclosure.

Looking at FIG. 1, an example arrangement of a transmitter-receiver array for a borehole to borehole electromagnetic survey is shown. The transmitter can be electromagnetic energy source 10. Electromagnetic energy source 10 can be located within well borehole 12. Well borehole 12 can extend through subsurface hydrocarbon reservoir 14. Electromagnetic energy source 10 can emit pulses of electromagnetic energy to travel through subsurface hydrocarbon reservoir 14 for electromagnetic imaging of subsurface hydrocarbon reservoir 14.

Although one electromagnetic energy source 10 is shown in the example of FIG. 1, in alternate embodiments, multiple electromagnetic energy sources 10 can be located within well borehole 12. Alternately, one or more electromagnetic energy sources 10 can be located at the earth surface 15 above the subsurface hydrocarbon reservoir. In the example of FIG. 1, a series of electromagnetic sensors 16 are located in sensor bore 18. Sensor bore 18 can be a borehole that extends through subsurface hydrocarbon reservoir 14 and spaced apart from well borehole 12. In alternate embodiments, electromagnetic sensors 16 can be in an array over the earth surface 15 above subsurface hydrocarbon reservoir 14 (not shown). When electromagnetic energy source 10 is located in well borehole 12 and electromagnetic sensors 16 are located over the earth surface 15, the arrangement is known as a borehole to surface array. Generally either or both of the electromagnetic energy source 10 and electromagnetic sensors 16 are located within a borehole so that the EM signals pass through subsurface hydrocarbon reservoir 14 when traveling from electromagnetic energy source 10 to electromagnetic sensors 16. Electromagnetic sensors 16 can form a measure of the arrival time of the emitted pulses from electromagnetic energy source 10 to image subsurface hydrocarbon reservoir 14.

As can be seen in FIG. 1, a multitude of EM energy measurements can be performed with different combinations of transmitter locations 20 and receiver locations 22 in order to sample various parts of the subterranean features from different directions, including subsurface hydrocarbon reservoir 14. Both the electromagnetic energy source 10 and electromagnetic sensors 16 can be a part of a downhole tool or located in a tool and can be movable to between a succession of locations, such as between transmitter locations 20 and receiver locations 22.

Electromagnetic energy source 10 can be attached to source wireline 24 for travel in well borehole 12 to a depth of interest. In the example of FIG. 1, the source wireline 24 extends from vehicle 26 at the surface. System control unit 28 can be associated with vehicle 26 and can be used to control the pulses emitted by electromagnetic energy source 10. A second vehicle 30 can have a receiver wireline 32 for attaching to electromagnetic sensors 16 and for moving electromagnetic sensors 16 within sensor bore 18. Electromagnetic energy source 10 can include a quarter wave dipole antenna.

Figure 3:
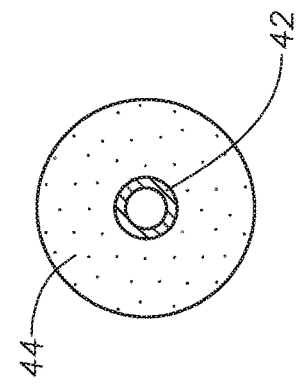
FIG. 3 is a schematic cross section view of the electromagnetic energy source of FIG. 2.
Figure 2:
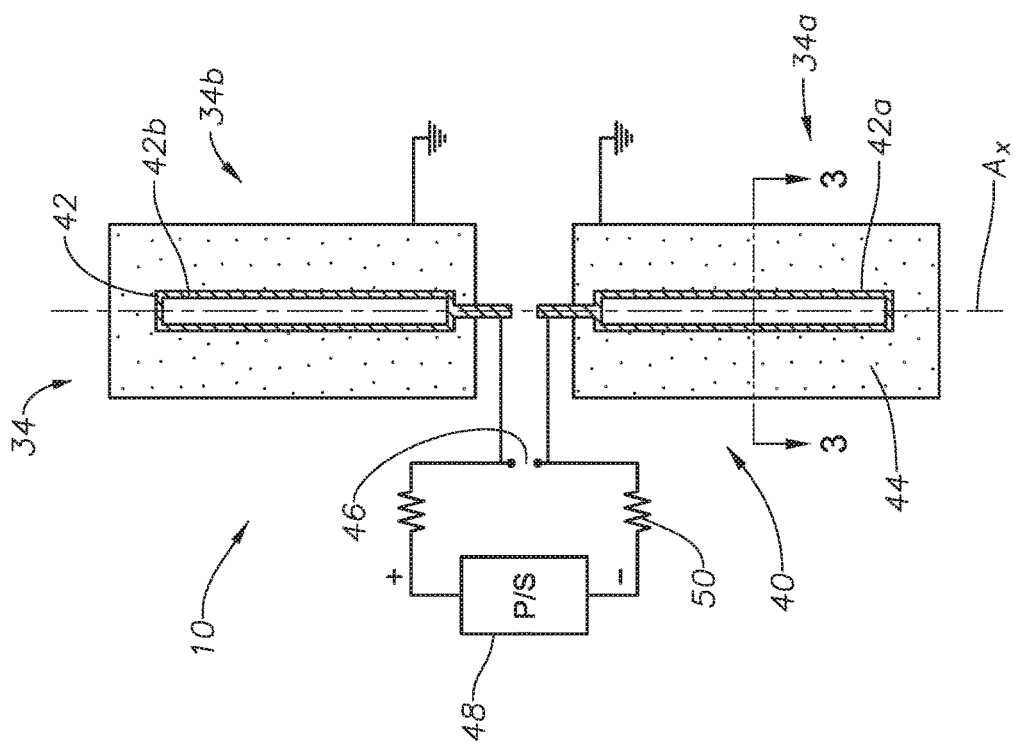
FIG. 2 is a schematic section view of an electromagnetic energy source and storage capacitor, in accordance with an embodiment of this disclosure.

Looking at FIGS. 2-3, electromagnetic energy source 10 includes sonde assembly 34. Sonde assembly 34 has two main sections: first section 34a is axially aligned with, and spaced from, second section 34b. Electromagnetic energy source 10 also includes energy storage capacitor 40 with capacitive charge storage medium 44.

An electrode 42 is mounted in each of first section 34a and second section 34b of sonde assembly 34. First electrode 42a is located in first section 34a and second electrode 42b is located in second section 34b. Electrode 42 can be an elongated member and have a tubular shape. Electrode 42 can be formed of copper, and in alternate embodiments, can be formed of silver, aluminum, gold or other material with sufficient conductivity, corrosion resistance and hardness suitable for use as an electrode.

Capacitive charge storage medium 44 is mounted in each of the first section 34a and the second section 34b of the sonde assembly 34. Capacitive charge storage medium 44 can include giant dielectrics and giant permeability ferrites, the benefits of which are discussed in this disclosure. In the example embodiments of FIGS. 2-3 an electric field can radiate out from each electrode 42 and through the nearby capacitive charge storage medium 44 forming energy storage capacitor 40.

Figure 4:
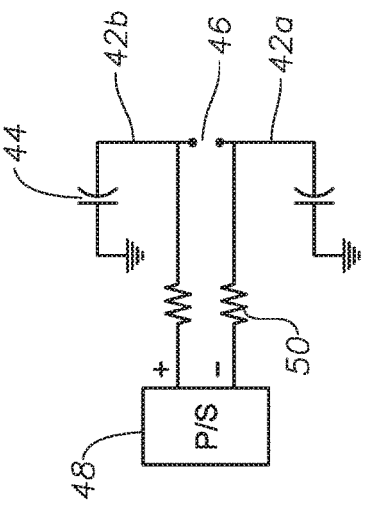
FIG. 4 is a schematic cross section view of the electromagnetic energy source of FIG. 2.

Looking at FIG. 4, electromagnetic energy source 10 can further include fast-closing switch 46, which is located between first and second electrodes 42a, 42b of first and second sections 34a, 34b, respectively. Fast-closing switch 46 can be, for example, a spark gap. When fast-closing switch is closed, such as when the spark gap is broken down, electromagnetic energy source 10 will generate an electromagnetic pulse. As an example, when the potential difference between first and second electrodes 42a, 42b exceeds the breakdown voltage of a gas within the gap, an electric spark can pass between first and second electrodes 42a, 42b. In alternate embodiments, fast-closing switch 46 can include avalanche transistors, thyratrons, ignitrons, silicon-controlled rectifier, and especially triggered spark gaps. Fast-closing switch 46 can be selected to have performance metrics concerning peak current, peak voltage, useful number of shots, jitter, complexity and geometry that will suit the environment, conditions, and performance criteria for which the electromagnetic energy source 10 is to be used.

Electromagnetic energy source 10 can also have high voltage power supply 48 connected between first and second electrodes 42a, 42b. High voltage power supply 48 can have, for example, a voltage over 1,500 volts. Power can be provided to high voltage power supply 48 from outside of electromagnetic energy source 10 with pair of high resistivity leads. High impedance direct current (DC) connections will reduce the amount of induced current that will be generated in the connections by the high current pulse through electrode 42 when sonde assembly 34 discharges.

In the example embodiment of FIGS. 2-4, capacitive charge storage medium 44 acts as a ground. In such an embodiment, capacitive charge storage medium 44 proximate to electrode 42 will form energy storage capacitor 40 and capacitive charge storage medium 44 proximate to an outer diameter of capacitive charge storage medium 44 will act as the ground.

Current limiting resistors 50 can be located between high voltage power supply 48 and both of the first electrode 42*a* of the first section 34*a* and the second electrode 42*b* of the second section 34*b*. Current limiting resistors 50 can block high current pulses from returning up the supply wire towards high voltage power supply 48. This will isolate the antenna system from high voltage power supply 48 while the electromagnetic pulse is being emitted.

It is noted that in each example embodiment, high voltage power supply 48 is located between the same components as fast-closing switch 46 and a component that is not directly connected to high voltage power supply 48 can act as a ground.

In the example embodiment of FIGS. 2-3, each section 34*a*, 34*b* of sonde assembly 34 can include an elongated tubular member with a central bore centered around axis Ax. Electrode 42 is centered along axis Ax of each of first section 34*a* and second section 34*b* of sonde assembly 34. Electrode 42 is sheathed within capacitive charge storage medium 44 so that capacitive charge storage medium 44 surrounds electrode 42. Energy storage capacitor 40 is formed by an electric field radiating out from electrode 42 and through the nearby capacitive charge storage medium 44. The amount of energy stored will vary with the square of the electric field. If electrode 42 has a small diameter, then almost all of the electric field potential drop will occur inside the capacitive charge storage medium 44.

Figure 6:
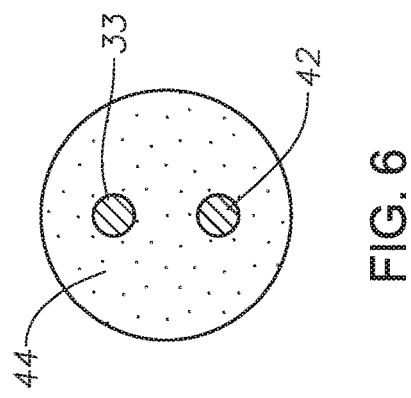
FIG. 6 is a schematic cross section view of the electromagnetic energy source of FIG. 5.
Figure 5:
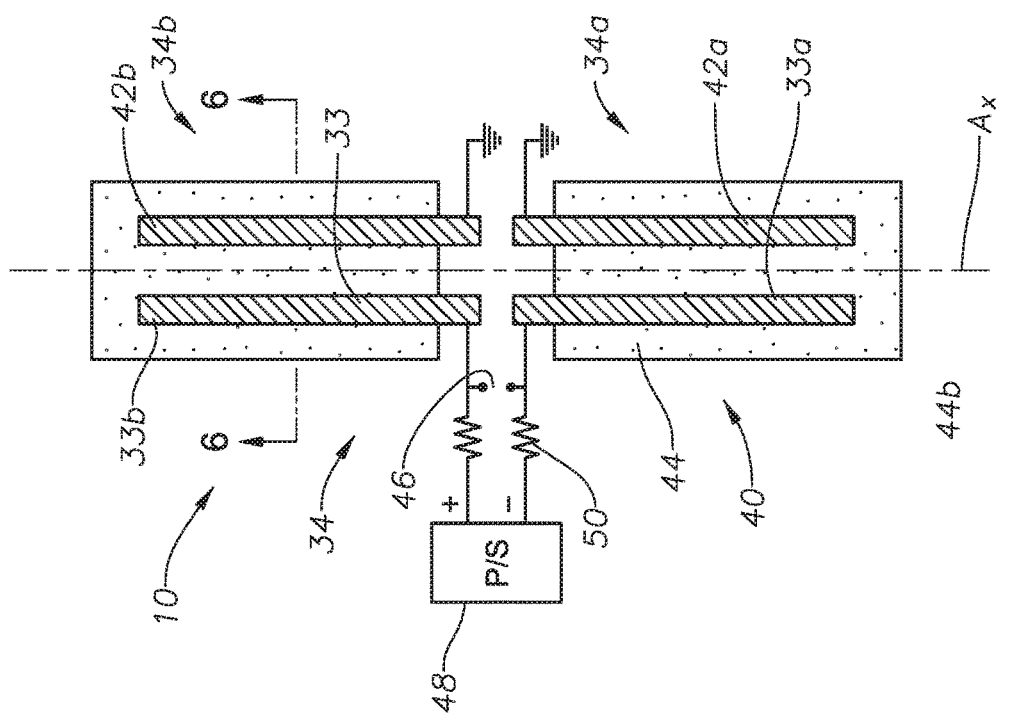
FIG. 5 is a schematic section view of an electromagnetic energy source, in accordance with an embodiment of this disclosure.

Looking at the example embodiment of FIGS. 5-6, conductor member 33 of sonde assembly 34 serves as a first conductor and capacitive charge storage medium 44 is located between the conductor member 33 and electrode 42. Capacitive charge storage medium 44 electrically isolates conductor member 33 from electrode 42. In such an embodiment, conductor member 33 and electrode 42 are both shown as elongated members that can be a solid rod or wire.

In the embodiment of FIGS. 5-6, fast-closing switch 46 is connected between first and second conductor members 33*a*, 33*b* and high voltage power supply 48 is also connected between first and second conductor members 33*a*, 33*b* of conductor member 33. In this example embodiment, first electrode 42*a* and second electrode 42*b* act as grounds. Current limiting resistors 50 can be located between high voltage power supply 48 and both of the first conductor member 33*a* of the first section 34*a* and the second conductor member 33*b* of the second section 34*b*.

In the example embodiment of FIGS. 5-6, conductor member 33 can be a wire that extends through each section 34*a*, 34*b* of sonde assembly 34. Conductor member 33 is sheathed within capacitive charge storage medium 44. Electrode 42 can also be a wire that extends through each section 34*a*, 34*b* of sonde assembly 34. Electrode 42 is also sheathed within capacitive charge storage medium 44. Energy storage capacitor 40 is formed by the pair of wires, which are electrode 42 and conductor member 33 which can have a great potential voltage between them. Capacitive charge storage medium 44 between electrode 42 and conductor member 33 increases the mutual capacitance of electrode 42 and conductor member 33. Conductor member 33 and electrode 42 serve both as conductor elements of energy storage capacitor 40 and as part of the transmitting elements of electromagnetic energy source 10 for emitting the electromagnetic pulse.

Figure 8:
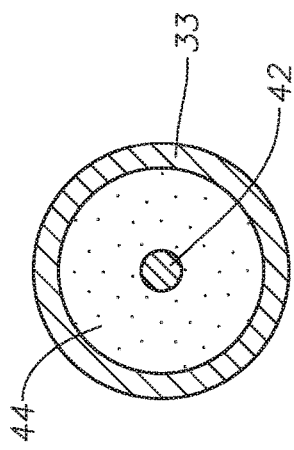
FIG. 8 is a schematic cross section view of the electromagnetic energy source of FIG. 7.
Figure 9:
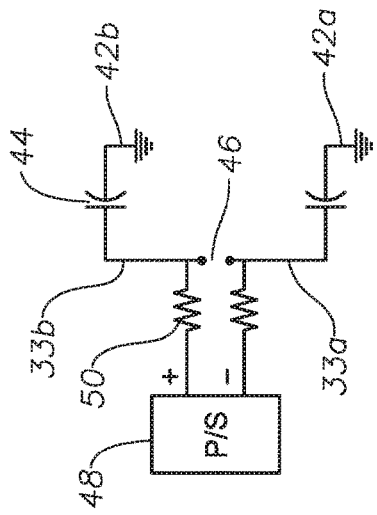
FIG. 9 is a circuit diagram of the electromagnetic energy source of FIG. 7.
Figure 7:
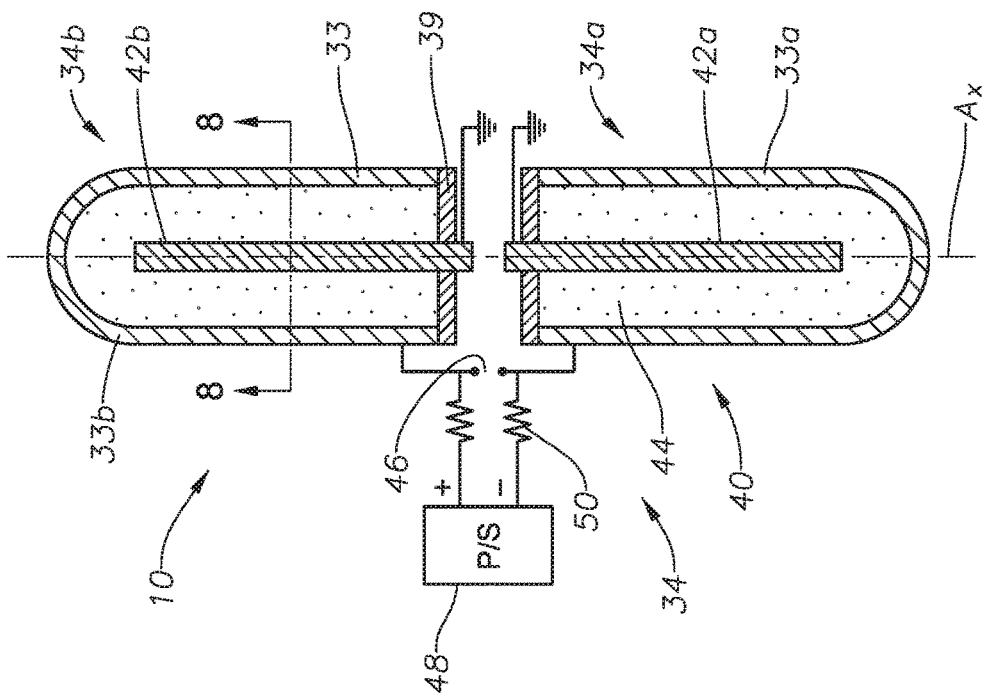
FIG. 7 is a schematic section view of an electromagnetic energy source, in accordance with an embodiment of this disclosure.

Looking at the example embodiment of FIGS. 7-9, conductor member 33 of sonde assembly 34 serves as a first conductor and capacitive charge storage medium 44 is located between the conductor member 33 and electrode 42. Capacitive charge storage medium 44 electrically isolates conductor member 33 from electrode 42. In such an embodiment, conductor member 33 is an outer body that surrounds capacitive charge storage medium 44. Electrode 42 is shown as elongated members that can be a solid rod or wire. Each section 34*a*, 34*b* of sonde assembly 34 can have end cap 39 formed of an insulating material. The capped end of first section 34*a* and second section 34*b* can face towards each other. Electrode 42 can protrude through end cap 39 of sonde assembly 34.

In the embodiment of FIGS. 7-9, fast-closing switch 46 is connected between first and second conductor members 33*a*, 33*b* and high voltage power supply 48 is also connected between first and second conductor members 33*a*, 33*b* of conductor member 33. In this example embodiment, first electrode 42*a* and second electrode 42*b* act as grounds. Current limiting resistors 50 can be located between high voltage power supply 48 and both of the first conductor member 33*a* of the first section 34*a* and the second conductor member 33*b* of the second section 34*b*.

In the example of FIGS. 7-8, conductor member 33 can be an outer metallic body of sonde assembly 34. Each section 34*a*, 34*b* of sonde assembly 34 can have an elongated tubular member, such as a metallic body, that is closed at one end and has an end cap 39 at an opposite end. Sonde assembly 34 can have a central bore centered around axis Ax. Electrode 42 is centered along axis Ax of each of first section 34*a* and second section 34*b* of sonde assembly 34. Electrode 42 can be an elongated member and can be a solid rod. Conductor member 33 and electrode 42 serve both as conductor elements of energy storage capacitor 40 and as part of the transmitting elements of electromagnetic energy source 10 for emitting the electromagnetic pulse.

Figure 10:
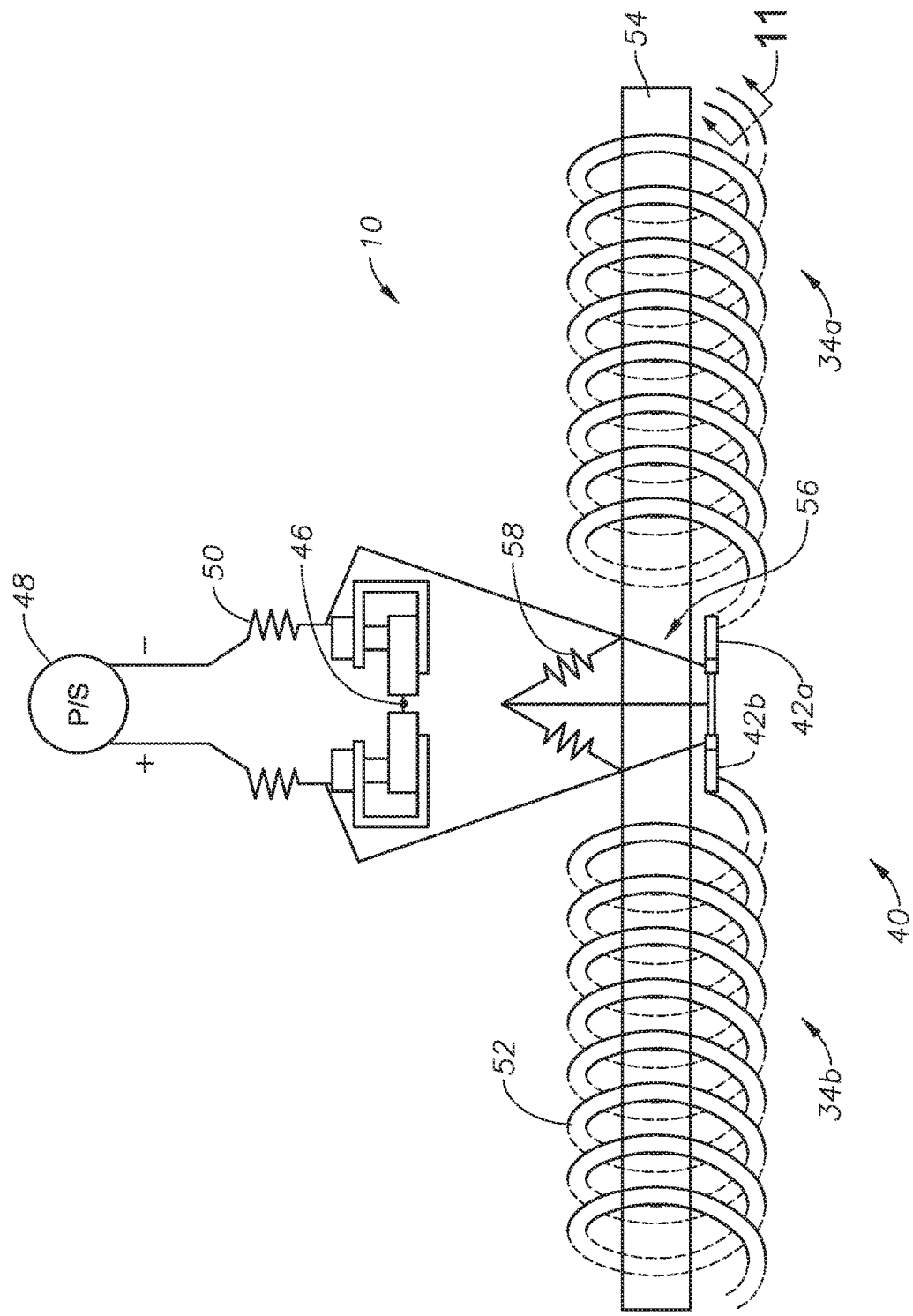
FIG. 10 is a schematic section view of an electromagnetic energy source and storage capacitor, in accordance with an embodiment of this disclosure.
Figure 11:
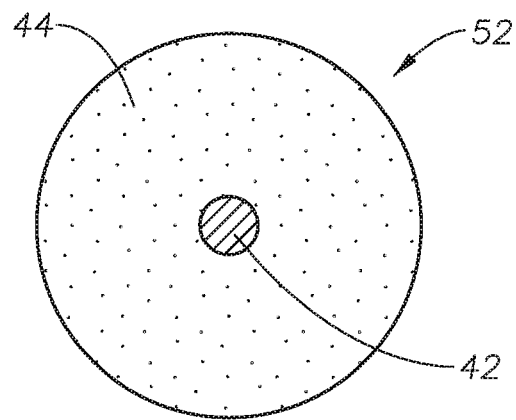
FIG. 11 is a schematic cross section view of the co-axial able of the electromagnetic energy source of FIG. 10.
Figure 12:
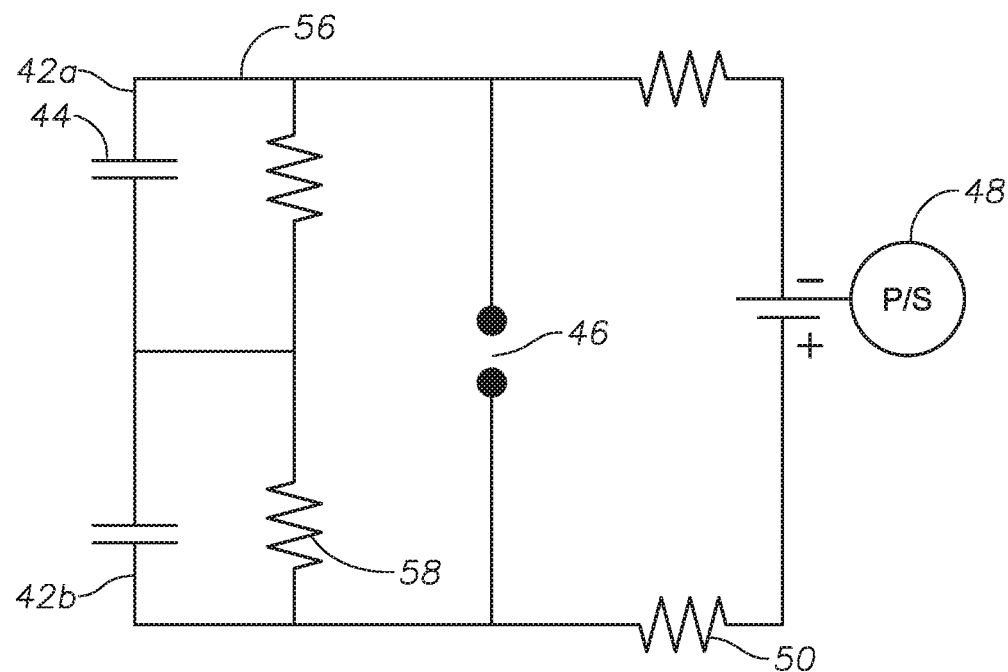
FIG. 12 is a circuit diagram of the electromagnetic energy source of FIG. 10.

Looking at the example embodiment of FIGS. 10-12, sonde assembly 34 includes co-axial cable 52 that is wrapped around core member 54. Core member 54 can be, for example a polyvinyl chloride (PVC) pipe or other available suitable core member that provides sufficient support for co-axial cable 52 without interfering with the performance of sonde assembly 34. If co-axial cable 52 is stiff and strong enough to be self-supporting, no core member is required. Co-axial cable 52 includes electrode 42 that can be a wire that extends within co-axial cable 52. Capacitive charge storage medium 44 of co-axial cable 52 surrounds electrode 42.

In the embodiment of FIGS. 10-12, fast-closing switch 46 is connected between first and second electrodes 42*a*, 42*b* and high voltage power supply 48 is also connected between first and second electrodes 42*a*, 42*b*. In this example capacitive charge storage medium 44 of the first section 34*a* and the second section 34*b* are connected in series. Current limiting resistors 50 can be located between high voltage power supply 48 and both of the first electrode 42*a* of the first section 34*a* and the second electrode 42*b* of the second section 34*b*. The braid 56 of co-axial cable 52 connect first electrode 42*a* and second electrode 42*b* together by way of secondary resistors 58. Secondary resistors 58 reflect current so that a maximum voltage is directed to spark gap 46 once the capacitors are discharged.

In the example embodiment of FIGS. 10-12, first and second electrodes 42*a*, 42*b* can be a wire that extends through each section 34*a*, 34*b* of sonde assembly 34, respectively. Each electrode 42 is sheathed within capacitive charge storage medium 44 so that capacitive charge storage medium 44 surrounds electrode 42. Energy storage capacitor 40 is formed by an electric field radiating out from electrode 42 and through the nearby capacitive charge storage medium 44. By using coiled co-axial cable, the capacitance of the antenna can be set by coiling the required length of co-axial cable around core member 54. In this way, the capacitance of the antenna can be modulated without changing the overall length of the antenna.

In each of the example embodiments, capacitive charge storage medium 44 can include giant dielectrics and giant permeability ferrites. Depending on the desired frequency, using giant dielectrics and giant permeability ferrites can allow the length of the antenna to be reduced to a length in the range of 0.10 meters (m) to 2 m, for frequencies in the range of 10 kilohertz (kHz) to 1 MHz. Giant dielectrics and giant permeability ferrites are a special class of materials with dielectric constants from 104-105 and ferrites with relative magnetic permeability of more than 600 in the 10 kHz-1 MHz range. Cladding the EMU impulse antenna with these materials allows for a maximum height reduction of the antenna's physical length by orders of magnitude compared to conventional high dielectric and magnetic permeability materials, and does not require the cladding to be thick, which is a common problem when constructing slow wave antennas.

A slow wave refers to the group velocity of the EM wave travelling along the structure. The group velocity can be made slower by changing the electromagnetic properties of the guiding structure or in particular, the cladding around the guidewire according to the formula:

$$V \propto \frac{1}{\sqrt{\varepsilon_r \mu_r}}$$

where V=wave velocity, $\varepsilon_r$ is the dielectric constant, and $\mu_r$ is the relative magnetic permeability.

The slower group velocity of the EM waves allows a proportional reduction in the physical length of the antenna which is especially important for lower frequency applications, such as applications with frequencies in the 10 kHz-1 MHz range, with very large wavelengths, such as where the length of the antenna corresponding to one quarter of the resonant wavelength of the non-cladded antenna is hundreds of meters.

The height reduction factor (N) of a slow wave antenna is the ratio of the electrical length of the cladded antenna to the electrical length of the uncladded antenna. The maximum height reduction factor is therefore directly related to:

$$\sqrt{\varepsilon_r \mu_r}$$

or simply put, the slower the velocity of the EM wave, the more the physical length of the dipole antenna can be reduced.

For traditional high dielectric and ferrite materials, the cladding thickness increases with decreasing frequencies. At about 100 MHz the equations governing cladding thickness show the thickness to become impractically bulky and non-uniform. For applications where wavelengths are in the hundreds of meters, such as in the 750 kHz-1 MHz range, using these materials for a pulsed dipole antenna would result in an impractically thick cladding or an impractically long antenna for downhole work or both.

The giant dielectric materials include but are not limited to calcium copper titanate (CCTO), the family of A-Cu3Ti4O12 compounds (where A is a trivalent rare earth or Bi), doped nickel oxide, doped cupric oxides, barium titanate, bismuth strontium titanate, and other materials that include iron combined with manganese, zinc and nickel based compounds. Note that a doped metal is a metal that has intentional impurities for changing the electrical properties of the metal.

Figure 13:
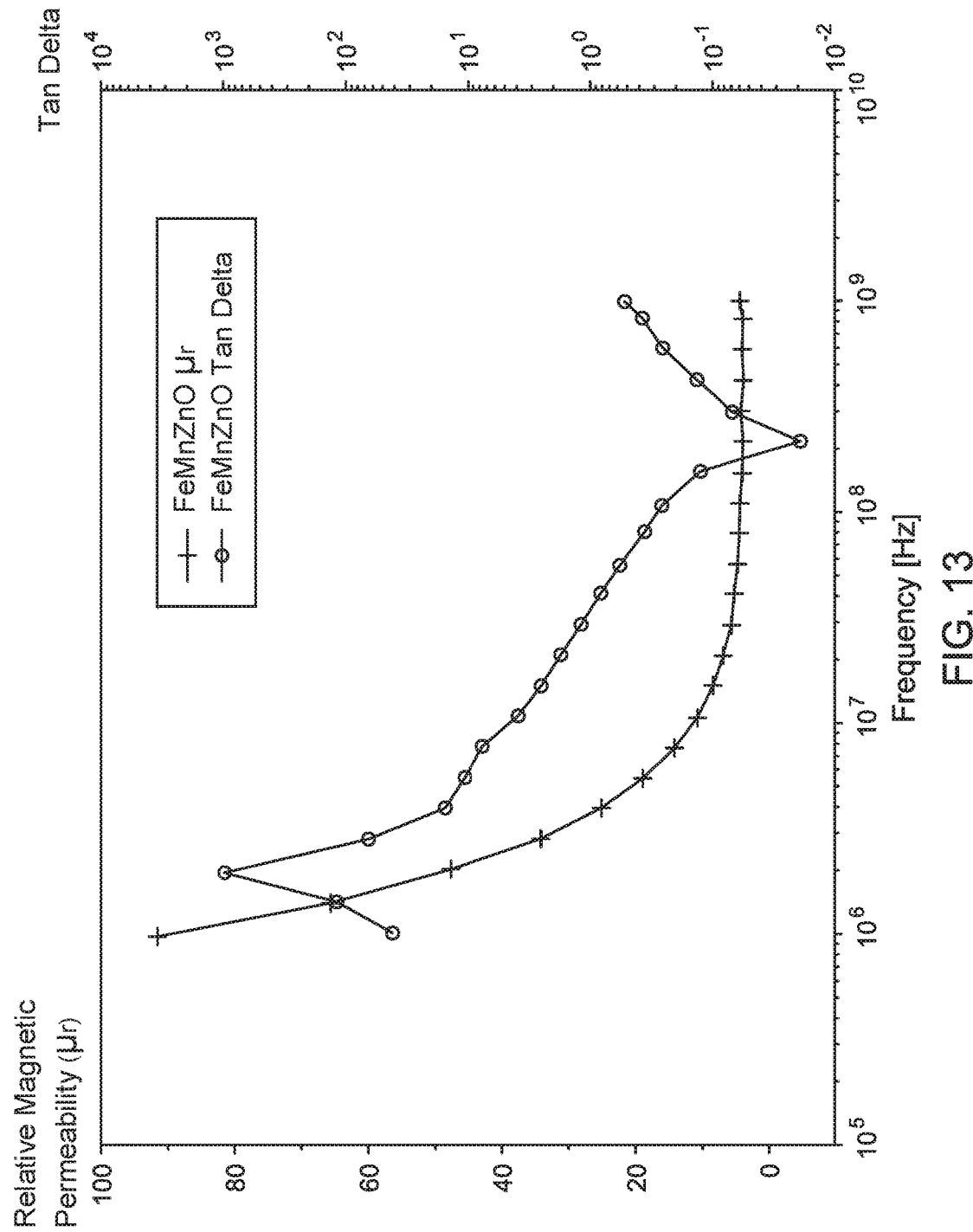
FIG. 13 is a graph showing the relative magnetic permeability by frequency of a giant ferrite FeMn(ZnO).
Figure 14:
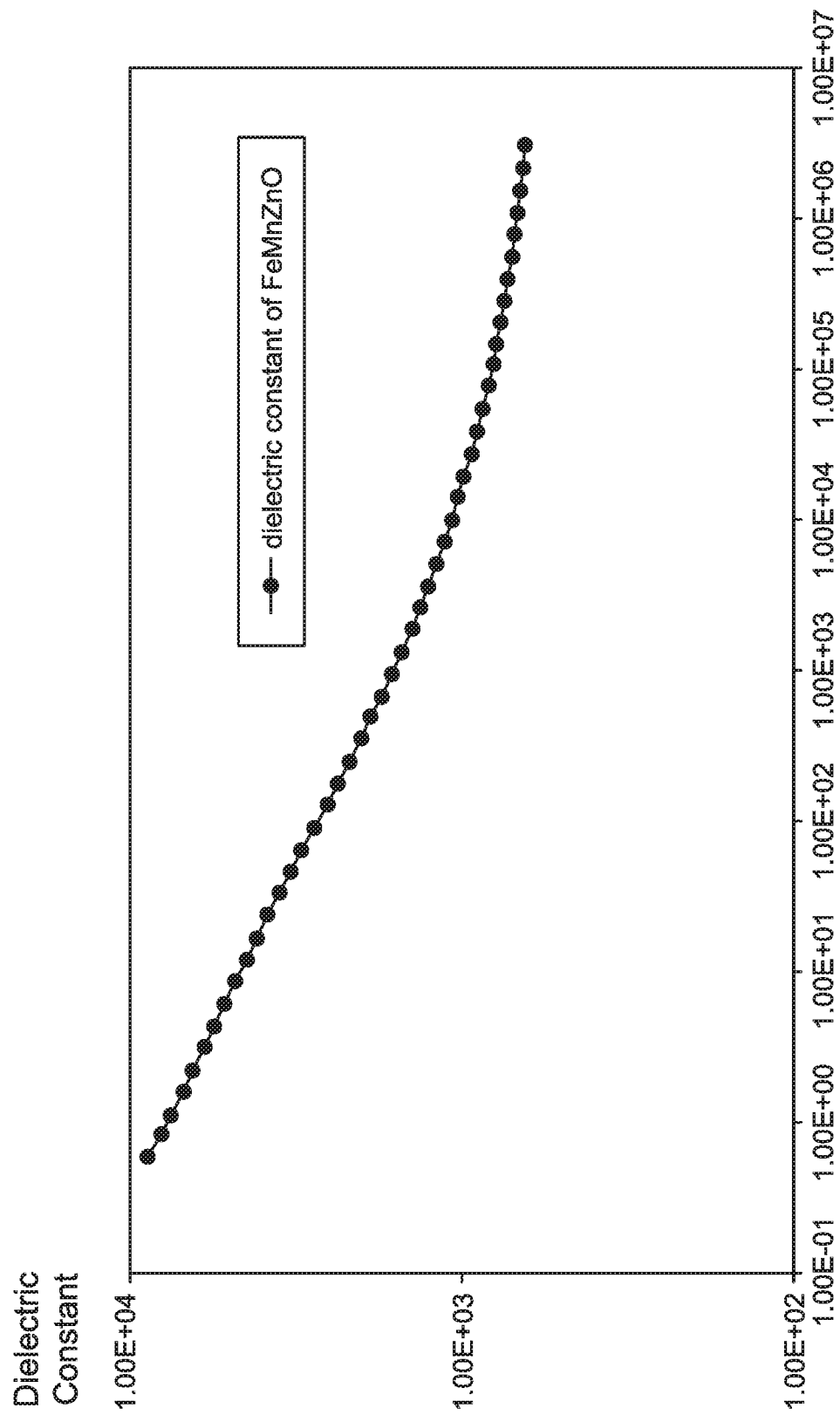
FIG. 14 is a graph showing the dielectric constant by frequency of the giant ferrite FeMn(ZnO).

As an example, FIG. 13 shows the relative magnetic permeability by frequency of a giant ferrite FeMn(ZnO). Looking at FIG. 13, the spectrometer used in the laboratory testing detected high frequencies in a range from 1 MHz-1 (gigahertz) GHz. When the frequency is less than 10 MHz, the relative magnetic permeability rises exponentially. Extrapolation of such testing results in the relative magnetic permeability being near or over 1000 at 100 kHz. Looking at FIG. 14, the dielectric constant of the same material, FeMn(ZnO) is shown by frequency. At 100 Hz the antenna height reduction factor for this material would be 1000.

As used herein, the antenna height reduction factor (n) is defined by:

$$n = \sqrt{\varepsilon_r \mu_r}$$

Where $\varepsilon_r$ is the relative electric permittivity (also known as the dielectric constant) and $\mu_r$ is the relative magnetic permeability of the antenna cladding material. This height reduction factor value n can then be multiplied by the length of a hypothetical antenna using materials where $\varepsilon_r$ and $\mu_r$ are both equal to one to determine how much the height of the antenna of the current disclosure has been reduced by having increased the electrical and magnetic properties of the cladding.

Looking at FIG. 1, in an example of operation, in order to form an electromagnetic image of subsurface hydrocarbon reservoir 14 electromagnetic energy source 10 can be mounted to, or part of, a well tool and lowered on a wireline in well borehole 12 to a depth of interest.

The downhole tool associated with electromagnetic energy source 10 can have an upper section with a mechanical connector that attaches to a wire line, an electrical power connection, and a synchronizing signal connection. Such upper section and connections can be orientated like known current downhole wireline tools. A lower section of the downhole tool can house sonde assembly 34. Electromagnetic energy source 10 can be encased in a strong, insulating polymeric material to provide structural integrity while also allowing for the transmission of electromagnetic signals.

A single electromagnetic energy source 10 can be utilized, as shown in the example of FIG. 1. Alternately, a plurality of electromagnetic energy sources 10 can be lowered in well borehole 12. Pulses of electromagnetic energy can be emitted from the single electromagnetic energy source 10, or at each of the plurality of electromagnetic energy sources 10, as applicable, to travel through subsurface hydrocarbon reservoir 14 and a resulting signal can be received by electromagnetic sensors 16. An electromagnetic pulse with known characteristics is generated from the high power, pulsed electromagnetic energy source 10 from locations in or near subsurface hydrocarbon reservoir 14. In order to generate the electromagnetic pulse, high voltage power supply 48 charges up energy storage capacitor 40 through current limiting resistor 50 until fast-closing switch 46 is closed. With the fast-closing switch closed, electromagnetic energy source 10 will emit the pulse of electromagnetic energy. After the electromagnetic pulse is emitted, high voltage power supply 48 can recharge energy storage capacitor 40.

By combining energy storage, pulse formation and radiating elements into a single structure, the problem of impedance matching between separate distributed components of an electromagnetic survey system required for these respective functions is eliminated. Systems and methods of this disclosure therefore eliminate the problem of load matching between a power supply, cable or transmission-line, and antenna. With the energy storage element of energy storage capacitor 40 and fast-closing switch 46 both inside the transmitting antenna element of the pair of disclosed self-powered impulse antennas, the need for a cable between the power source and the transmission element are eliminated, and reflections and losses in the system are minimized.

A plurality of electromagnetic sensors 16 can be mounted to or part of a well tool and lowered in sensor bore 18 that extends through subsurface hydrocarbon reservoir 14. Alternately, the plurality of electromagnetic sensors 16 can be arranged in an array over an earth surface 15 above subsurface hydrocarbon reservoir 14. The emitted pulsed EM signal is transmitted through subsurface hydrocarbon reservoir 14 and recorded at one or more electromagnetic sensors 16 after travel through the subsurface formations surrounding well borehole 12 and sensor bore 18. The EM signal recorded by electromagnetic sensors 16 differs from the pulsed signal emitted by electromagnetic energy source 10 in characteristics such as time, amplitude, power spectrum, and other characteristics that depend on the properties of the intervening medium (such as the reservoir) and spatial variations of those properties.

Electromagnetic energy source 10 can be moved between a succession of locations, such as transmitter locations 20, in well borehole 12 for emitting pulses of electromagnetic energy at such locations for travel through subsurface hydrocarbon reservoir 14. Similarly, electromagnetic sensors 16 can be moved between a succession of locations, such as receiver locations 22, to receive the resulting signal at such succession of locations. In this way, a more complete electromagnetic image can be formed of subsurface hydrocarbon reservoir 14.

Recording and processing instrumentation associated with system control unit 28 at the surface can receive and store information relating to the resulting signal received by electromagnetic sensors 16. System control unit 28 can also perform additional functions such as computerized analysis of the resulting signal, display certain results derived from the resulting signal, and store the resulting signal and computerized analysis on a computer for further processing and computerized analysis. System control unit 28 can, as an example, be used to form a measure of the arrival time of the emitted pulses at a plurality of electromagnetic sensors, and to analyze the measure of arrival time data from the plurality of electromagnetic sensors. From this information, a representation of subsurface features of the subsurface hydrocarbon reservoir, and an image of the representation of subsurface features of the subsurface hydrocarbon reservoir, can be formed.

Embodiments of this disclosure thus generate information about the spatial distribution and composition of fluids in a hydrocarbon reservoir. The operation can be repeated periodically to, as an example determine the direction, velocity and saturation of injected fluids, such as a water flood, or to visualize modified reservoir volume as a function of time. This can assist in optimizing reservoir management, preventing oil bypass and thereby improving volumetric sweep efficiency and production rates.

By using giant dielectric/ferrite material, an antenna transmitting at 100 kHz would be reduced from 3000 m for an unclad antenna, to approximately 30 m for an antenna with conventional high dielectric constant ferrite materials and down to 0.25 m for an antenna clad in giant dielectric ferrite materials.

Embodiments of this disclosure have been sufficiently described so that a person with ordinary skill in the art may reproduce and obtain the results mentioned in this disclosure. Nonetheless, any skilled person in the field of technique, subject of this disclosure, may carry out modifications not described in this disclosure, to apply these modifications to a determined structure, or in the manufacturing process of the same, and such resulting structures shall be covered within the scope of this disclosure.

It should be noted and understood that there can be improvements and modifications made of the present embodiments described in detail in this disclosure without departing from the scope of the disclosure.

What is claimed is:

1. A method for emitting pulses of electromagnetic energy with an electromagnetic energy source, the method comprising:
   providing the electromagnetic energy source having:
      a sonde assembly including a first section axially aligned with, and spaced from, a second section;
      an energy storage capacitor including an electrode mounted in each of the first section and the second section of the sonde assembly and a capacitive charge storage medium mounted in each of the first section and the second section of the sonde assembly and surrounding the electrode, where the capacitive charge storage medium is a giant dielectrics and giant permeability ferrite; and
      a fast-closing switch located between the electrodes of the first section and the second section; and
   charging the energy storage capacitor to cause the fast-closing switch to close and pulses of electromagnetic energy to be emitted from the electromagnetic energy source.

2. The method according to claim 1, where the electromagnetic energy source further includes a high voltage power supply connected to the electrode of the first section and the electrode of the second section of the sonde assembly.

3. The method according to claim 2, where the electromagnetic energy source further includes current limiting resistors located between the high voltage power supply and both of the electrode of the first section and the electrode of the second section.

4. The method according to claim 1, further including lowering the electromagnetic energy source on a wireline in a well borehole to a depth of interest in a subsurface hydrocarbon reservoir.

5. The method according to claim 1, further including moving the electromagnetic energy source to a succession of locations in a well borehole for emitting the pulses of electromagnetic energy at the succession of locations for travel through a subsurface hydrocarbon reservoir.

6. The method according to claim 1, further including lowering a plurality of electromagnetic sensors through a sensor bore in a subsurface hydrocarbon reservoir.

7. The method according to claim 1, further including locating a plurality of electromagnetic sensors in an array over an earth surface above a subsurface hydrocarbon reservoir.

8. The method according to claim 1, further including:
- directing the pulses of electromagnetic energy emitted from the electromagnetic energy source to travel through a subsurface hydrocarbon reservoir;
- forming a measure of arrival time data of the pulses of electromagnetic energy at a plurality of electromagnetic sensors;
- analyzing the measure of arrival time data from the plurality of electromagnetic sensors to form a representation of subsurface features of the subsurface hydrocarbon reservoir; and
- forming an image of the representation of subsurface features of the subsurface hydrocarbon reservoir.

\* \* \* \* \*